Figures 1, 10:
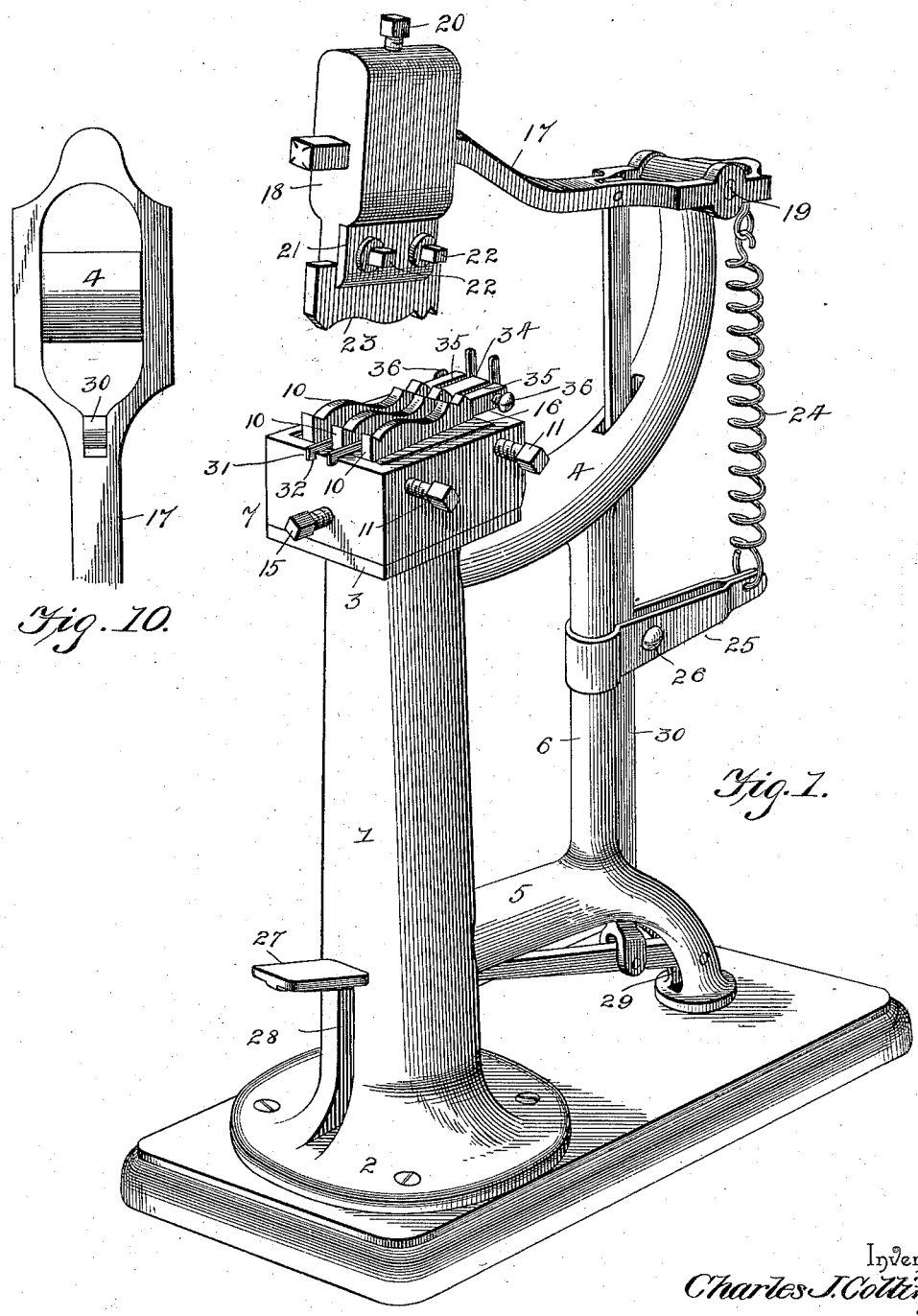

(No Model.) 2 Sheets—Sheet 1.

C. J. COLLING.
MACHINE FOR MAKING CURVED MOLDING AND EMBOSSING SHEET METAL.

No. 558,673. Patented Apr. 21, 1896.

Witnesses
E. H. Monroe
V. B. Hillyard

Inventor
Charles J. Colling
By his Attorneys,
C. A. Snow & Co.

(No Model.) 2 Sheets—Sheet 2.
C. J. COLLING.
MACHINE FOR MAKING CURVED MOLDING AND EMBOSSING SHEET METAL.
No. 558,673. Patented Apr. 21, 1896.
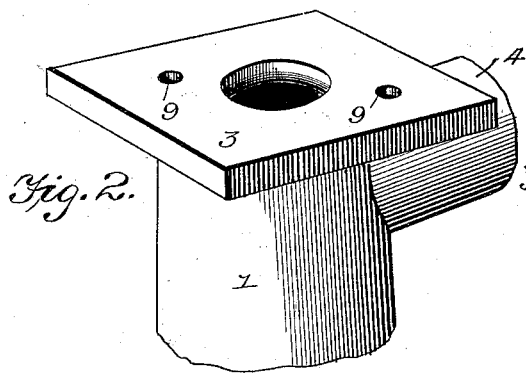
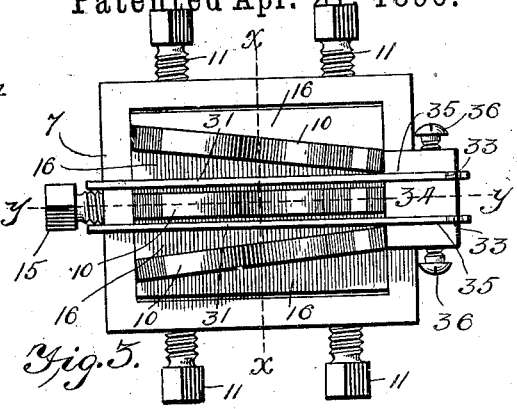
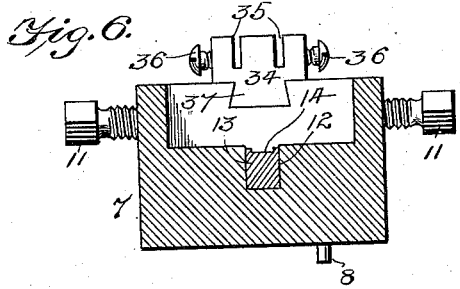
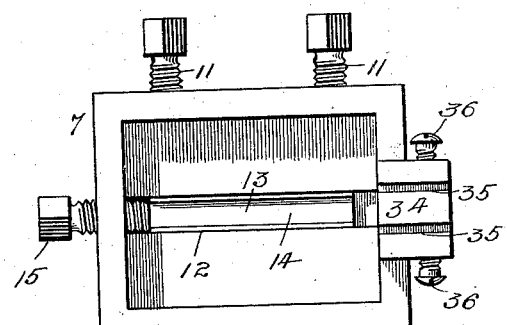
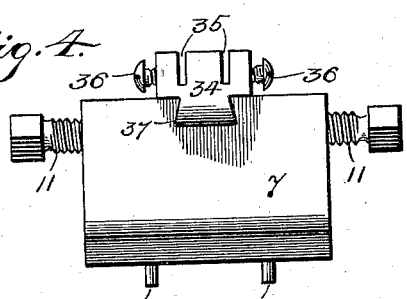
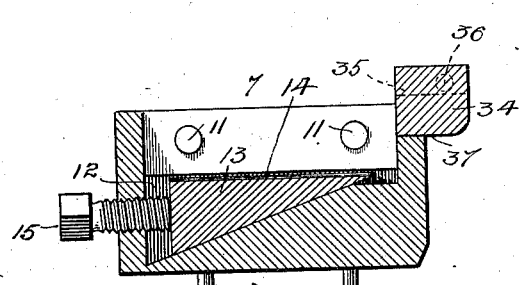
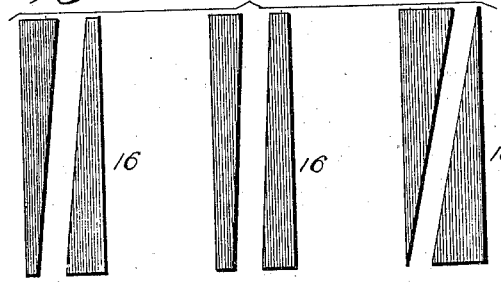
Witnesses
F. H. Monroe
V. B. Hillyard
By W. S. Attorneys:
Inventor
Charles J. Colling,
C. A. Snow & Co.

UNITED STATES PATENT OFFICE.

CHARLES J. COLLING, OF CINCINNATI, OHIO.

MACHINE FOR MAKING CURVED MOLDING AND EMBOSSING SHEET METAL.

SPECIFICATION forming part of Letters Patent No. 558,673, dated April 21, 1896.

Application filed July 29, 1895. Serial No. 557,454. (No model.)

*To all whom it may concern:*

Be it known that I, CHARLES J. COLLING, a citizen of the United States, residing at Cincinnati, in the county of Hamilton and State of Ohio, have invented a new and useful Machine for Forming Sheet Metal, of which the following is a specification.

This invention relates to machines for molding, curving, and embossing sheet metal of that class which embody in their organization an anvil, a chuck detachably connected with the anvil and provided with a middle and side dies, and a hammer carrying a die matching with the lower dies, so as to shape the sheet metal between the matching dies, the side dies being adjustable on curved lines to adapt the machine for forming the molding on the required curve.

The object of the invention is to simplify and cheapen the construction of machines of this character, to diminish the number of parts, to provide for the vertical adjustment of the central die of the chuck, to operate the hammer carrying the upper die in a curved line, so as to crimp the sheet from one edge, thereby obviating breaking and the scaling of the galvanizing, and to provide reversible guides, so that the sheet can be guided from either edge.

Other objects and advantages are contemplated and will become apparent as the nature of the invention is comprehended from the following description and the drawings hereto attached, in which—

Figure 1 is a perspective view of a machine constructed in accordance with the present invention. Fig. 2 is a detail view of the anvil or upper portion of the standard. Fig. 3 is a top plan view of the chuck detached from the anvil. Fig. 4 is an end view of the chuck. Fig. 5 is a detail view of the chuck having the guides or gages, the dies, and the adjusting-wedges removed therefrom. Fig. 6 is a cross-section of the chuck on the line X X of Fig. 3. Fig. 7 is a longitudinal section on the line Y Y of Fig. 3. Fig. 8 is a side elevation of a gage. Fig. 9 represents different forms of wedges for properly adjusting the side dies of the chuck. Fig. 10 is a top plan view of the rear portion of the hammer-bearing lever and its attachments.

The standard 1 is formed at its lower end with a foot or base 2 and at its upper end with an expanded part 3, forming an anvil, and from the rear side of the standard project arms 4 and 5, which curve in opposite directions and which are connected between their ends by means of a vertical bar 6. The standard, the arms, and the vertical bar are integrally formed, and the lower arm 5 terminates in the plane of the base 2 and obtains a purchase upon the floor or other support upon which the base 2 is placed, and serves to give stability to the machine when in operation.

The chuck 7 is a box-shaped frame having pins 8 projecting from its bottom side and adapted to enter corresponding openings 9, formed in the face of the anvil 3, so as to retain the chuck in proper relation. The dies 10, which may have any desired profile according to the pattern of the molding to be formed, are held in the chuck by means of binding-screws 11, which are fitted into threaded openings in the sides of the frame. A longitudinal groove 12 is formed in the bottom of the chuck, and the bottom thereof slants or inclines, and a wedge 13 is fitted in the longitudinal groove and its bottom edge corresponds to the pitch or inclination of the slant of the bottom of the longitudinal groove 12, and obtains a purchase or bearing thereon. The top edge of the wedge 13 is parallel with or corresponds to the plane of the bottom of the chuck, and has a longitudinal channel 14 for the reception of the lower edge portion of the middle die so as to hold the latter in proper position. A set-screw 15 is threaded into an opening in the end of the chuck opposite the deepened end of the longitudinal groove 12, and its inner end is adapted to bear against the larger end of the wedge 13 and move the latter in the groove 12 and cause the said wedge to ride upon the slanting or inclined bottom of the groove and elevate the middle die supported upon the said wedge, thereby making provision for the vertical adjustment of the middle die according to the nature of the work to be performed. It will be understood that the wedge 13 is of less length than the distance between the inner walls of the ends of the chuck-frame, thereby admitting of the longitudinal adjustment of the wedge in the groove 12 when it is required to raise or lower the middle die.

Adjusting-wedges 16 are interposed between the side and middle dies and between the side dies and the sides of the chuck, and these wedges will be provided in pairs which unitedly and with the thickness of a die will fill the space between the middle die and the side of the chuck. Thus for dies of a uniform thickness and for a chuck of a given dimension the pairs of adjusting-wedges will be of the same size or width, but the bevel of their meeting faces will vary, so that the side dies can be adjusted in curved or radial lines to meet the character of the work to be performed. In assembling the parts the complementary members of a pair of adjusting-wedges are arranged with one upon each side of the side dies. Hence it will be understood that when it is required to adjust the side dies the pairs of wedges are replaced by others whose meeting faces have the required pitch or bevel. The binding-screws 11 simply hold the dies and adjusting-wedges within the chuck after they have been properly placed in position.

The lever 17, carrying the hammer 18, is pivoted near its rear end to the upwardly-curved portion of the arm 4, and has a compound curve midway of its ends so as to throw its end portions in different relative planes. The rear end portion of the lever is slotted so as to embrace the sides of the arm 4, and is connected with the latter by means of the pivot-pin 19. The hammer 18 is adjustably mounted upon the lever 17, and is held in the required position by means of a binding-screw 20. A plate 21 is held to the side of the hammer 18 by means of binding-screws 22, and the upper die 23 is clamped between the plate 21 and a portion of the hammer and can be adjusted longitudinally by loosening the binding-screws 22 independently of the hammer or with the hammer by loosening the binding-screw 20. The die 23 is the counterpart or match of the lower dies 10 and acts in conjunction therewith to shape the sheet metal placed between the two sets of dies. A coil-spring 24 connects the rear end portion of the lever 17 with an arm 25, secured to the vertical bar 6, and serves to hold the hammer 18 in an elevated position. The arm 25 has adjustable connection with the bar 6 to admit of varying the tension of the spring 24, and this arm is formed from a strip of sheet metal which is folded upon itself and which embraces the bar 6 in the fold or bight, the parallel portions of the strip being secured together by means of a binding-screw 26, which provides for clamping the said arm 25 at the required position upon the bar.

The treadle 27 operates through a slot 28 in the lower portion of the standard 1 and in a slot 29 in the lower rear portion of the arm 5, and has pivotal connection at its rear end with the said arm 5. A rod or bar 30 connects the treadle 27 with the lever 17 and transmits motion from the treadle to the said lever in the efficient working of the machine.

The guides or gages 31 for giving proper direction to the sheet-metal blank to be shaped are wires or like bars having extensions 32 at their ends to engage with the end portions of the chuck so as to hold the said guides in a normal position. Vertical extensions 33, at one end of the guides or gages, engage with the edge of the sheet-metal blank and give proper direction to the latter when feeding it to the machine. A block 34 is provided at one end of the chuck, and has longitudinal grooves 35 in which are fitted the gages 31, the latter being held in the said grooves by means of binding-screws 36. This block may be formed with the chuck; but for convenience of manufacture it is separate therefrom and is provided on its under side with a wedge-shaped projection 37, which is fitted into a correspondingly-shaped notch in the upper edge of the end of the chuck to which the said block is applied, the said projection 37 being held in the notch by frictional engagement.

When it is required to make straight molding, the middle and side dies 10 are adjusted so that their upper edges lie in the same plane, and the sheet metal is fed to the machine by hand in the usual manner. At first the hammer 18 is operated lightly so as to make a slight impression upon the sheet-metal strip, and after the said strip has been fed its entire length it is again fed to the machine and the blow of the hammer increased. This operation is repeated until the molding is completed. If it be required to curve the molding, the side dies are properly adjusted upon the required radial lines, so that the crimping of the molding may be attained. This process will answer for slight curves or curves of great radius, but for small curves the sheet-metal strip must be cut to approximately the required curvature, as is common and well known in the art. It will be observed that the hammer travels in a curved path. Hence one end of the die engages with the sheet metal in advance of the opposite end, thereby adapting the sheet to conform to the outline of the dies without stretching, tearing, or breaking the same, as frequently occurs where the upper die travels in a vertical line or in such a manner as to cause the upper and lower dies to come squarely together at one and the same time. It will be understood that the profile of the dies will vary according to the pattern of the work and that the dies will be interchangeable. In every instance the upper and lower dies must match or correspond, so as to perform the required work in a satisfactory manner.

When it is required to curve the molding both radially and lineally, as for forming curved bases and crowns, the end dies are adjusted on radial lines and the middle die is lowered; but for curving the molding lineally only so as to convex it the middle die is lowered to the proper degree and all the dies are placed in parallelism.

The invention can be applied to machines especially designed for different varieties of work. Therefore it is to be understood that in the embodiment of the invention for a particular requirement changes in the form, proportion, and the minor details of construction may be resorted to without departing from the principle or sacrificing any of the advantages of this invention.

Having thus described the invention, what is claimed as new is—

1. A machine for shaping sheet metal, constructed substantially as herein set forth and comprising a standard having rearwardly-extending arms oppositely curving at their outer ends and braced by an intermediate vertical bar, a chuck removably fitted to the upper end of the standard and provided with the lower shaping-dies, a lever slotted near its rear end and having pivotal connection with the upper arm, a hammer adjustably connected with the lever and bearing the upper shaping-die to cause the latter to move in a curved path, a treadle having pivotal connection with the lower arm and operating through a slot at the foot of the standard, a rod connecting the pivoted lever and treadle, an arm having adjustable connection with the said vertical bar, and a spring connecting the pivoted lever and the said adjustable arm, substantially as and for the purpose set forth.

2. In combination, a chuck having a central longitudinal groove gradually deepening throughout its length, a wedge fitted in the said groove and having a longitudinal channel in its upper or outer edge, means for positively adjusting the wedge in its groove, a middle die having its lower edge portion seated in the channel of the wedge, dies arranged upon each side of the middle die, and means for adjusting the side dies on radial or diverging lines with respect to the middle die, substantially as set forth for the purpose described.

3. The combination with a chuck, a middle and side dies placed in the chuck, of corresponding and interchangeable wedges provided in pairs and adapted to have a wedge of each pair placed upon each side of the side dies to act jointly therewith to fill the chuck, whereby the relative adjustment of the side dies can be attained, substantially as and for the purpose set forth.

4. In combination, a chuck having a longitudinal groove in its bottom which gradually deepens throughout its length, a wedge fitted in the said longitudinal groove, a middle and side dies, the middle die supported upon the said wedge and the sides resting upon the bottom of the chuck upon each side of the said longitudinal groove, a set-screw for adjusting the wedge longitudinally to raise or lower the middle die, and pairs of wedges having one wedge of each pair placed upon opposite sides of the side dies, whereby the relative adjustment of the said side dies is secured, substantially as and for the purpose specified.

5. The combination with the anvil having a series of openings, of a chuck having pins to enter the said openings in the anvil and retain the chuck in proper position, a middle and side dies arranged in the chuck, means for adjusting the middle die vertically and the side dies on different radial lines, a pivoted lever, a hammer attached to the said lever and carrying a die to match with the lower dies, and means for actuating the said lever, substantially as and for the purpose set forth.

6. In a machine for shaping sheet metal, the combination with the chuck for holding the dies, and having a block at one end formed with longitudinal grooves, and binding-screws operating in threaded openings in the sides of the said block, of similar gages adjustably and reversibly secured in the said longitudinal grooves, and having extensions at their ends and an oppositely-projecting extension at one end, substantially as and for the purpose specified.

In testimony that I claim the foregoing as my own I have hereto affixed my signature in the presence of two witnesses.

CHARLES J. COLLING.

Witnesses:
HUGH W. BEARS,
HENRY HILLEBRAND, Jr.